US008039766B2

(12) United States Patent
Flanagan

(10) Patent No.: US 8,039,766 B2
(45) Date of Patent: Oct. 18, 2011

(54) OBSTRUCTION DETECTING FORCE SENSING SYSTEM WHEREIN THE THRESHOLD FORCE VALUE FOR DETECTING AN OBSTRUCTION IS SET ACCORDING TO THE CONFIGURATION OF THE BED

(75) Inventor: Joseph Flanagan, Aurora, IN (US)

(73) Assignee: Hill-Rom Services, Inc.

( * ) Notice: Subject to any disclaimer, the term of this patent is extended or adjusted under 35 U.S.C. 154(b) by 49 days.

(21) Appl. No.: 12/559,743

(22) Filed: Sep. 15, 2009

(65) Prior Publication Data

US 2011/0066287 A1 Mar. 17, 2011

(51) Int. Cl.
*G08B 23/00* (2006.01)
*G01G 19/52* (2006.01)

(52) U.S. Cl. ................. 177/144; 5/600; 5/618; 340/666

(58) Field of Classification Search .................. 177/144; 5/600, 616–619; 340/666
See application file for complete search history.

(56) References Cited

U.S. PATENT DOCUMENTS

| | | | | |
|---|---|---|---|---|
| 3,216,026 | A | 11/1965 | Mann | |
| 3,581,174 | A | 5/1971 | Hammer | |
| 4,403,214 | A | 9/1983 | Wolar | |
| 4,534,077 | A | 8/1985 | Martin | |
| 4,868,937 | A * | 9/1989 | Connolly | 5/608 |
| 5,181,288 | A * | 1/1993 | Heaton et al. | 5/607 |
| 5,317,769 | A | 6/1994 | Weismiller | |
| 5,592,060 | A | 1/1997 | Racine | |
| 5,861,582 | A | 1/1999 | Flanagan | |
| 6,002,227 | A | 12/1999 | Lamm | |
| 6,208,250 | B1 | 3/2001 | Dixon | |
| 6,291,957 | B1 | 9/2001 | Hopson | |
| 6,320,510 | B2 * | 11/2001 | Menkedick et al. | 340/573.1 |
| 6,340,872 | B1 | 1/2002 | Fitzgibbon | |
| 6,791,460 | B2 * | 9/2004 | Dixon et al. | 340/573.1 |
| 6,806,665 | B2 | 10/2004 | Fitzgibbon | |
| 7,170,248 | B2 | 1/2007 | Tsui | |
| 7,176,391 | B2 | 2/2007 | Metz | |
| 7,426,760 | B2 | 9/2008 | Vrzalik | |
| 7,472,437 | B2 | 1/2009 | Riley | |
| 7,834,768 | B2 * | 11/2010 | Dixon et al. | 340/573.1 |
| 2004/0124972 | A1 | 7/2004 | Strzelczyk | |
| 2006/0260054 | A1 * | 11/2006 | Lubbers et al. | 5/621 |
| 2007/0296600 | A1 * | 12/2007 | Dixon et al. | 340/573.1 |
| 2008/0289108 | A1 | 11/2008 | Menkedick | |

FOREIGN PATENT DOCUMENTS

WO 2008065402 A1 6/2008

* cited by examiner

*Primary Examiner* — Randy W Gibson
(74) *Attorney, Agent, or Firm* — Kenneth C. Baran

(57) ABSTRACT

An article 12 includes at least one component 28, 52, 54, 56, 58 moveable with respect to a ground. A load path extends from the component to the ground and includes a force detector 34. If one of the moveable components is requested to move in a way considered to be risky, and if a force discrepancy is detected, an action is commanded. In one specific embodiment the action is a corrective action. In one application of the disclosed subject matter the article is a hospital bed, the moveable components are a weigh frame and various deck sections, and the force detector is a load cell.

21 Claims, 10 Drawing Sheets

| | CONFIG. | SKETCH | RANGE & SUBRANGE OF MOTION | SAMPLE THRESHHOLD |
|---|---|---|---|---|
| 1 | LEVEL & FLAT |  | -h to +h | $T_1$ |
| 2 | HEAD DOWN |  | 0°→20°<br>0°→10°<br>10°→20° | <br>$T_2$<br>$T_3$ |
| 3 | HEAD UP |  | 0°→20°<br>0°→-10°<br>-10°→-20° | <br>$T_4$<br>$T_5$ |
| 4 | HEAD DECK SECTION ROTATION |  | 0°→65°<br>0°→20°<br>20°→40°<br>40°→65° | <br>$T_6$<br>$T_7$<br>$T_8$ |
| 5 | THIGH DECK SECTION ROTATION |  | 0°→30° | $T_9$ |
| 6 | CALF DECK SECTION ROTATION |  | 0°→22° | $T_{10}$ |
| 7 | CONTOUR |  | | $T_{11}$ |

OBSTRUCTION DETECTING FORCE SENSING SYSTEM WHEREIN THE THRESHOLD FORCE VALUE FOR DETECTING AN OBSTRUCTION IS SET ACCORDING TO THE CONFIGURATION OF THE BED

TECHNICAL FIELD

The subject matter described herein relates to articles with moveable components and particularly to an article having a system that commands a desired action in response to a perceived risk in combination with a perceived discrepancy in a sensed parameter such as a force. One example of such an article is a hospital bed.

BACKGROUND

A hospital bed includes a base frame and a weigh frame moveably connected to the base frame. A load path extending from the weigh frame to the base frame includes a force detector, such as a load cell, for determining the weight of a bed occupant. The bed also includes one or more deck sections secured to the weigh frame such that at least one deck section is moveable relative to the weigh frame. An object can become pinched between one of the moveable components and the floor or between two components in a state of relative motion. As a result, the object or the bed may sustain damage.

It is desirable, therefore, to provide a way to detect the pinch event and to take a desired action in response thereto.

SUMMARY

The article described herein includes at least one component moveable with respect to a ground. A load path extends from the component to the ground and includes a force detector. If a moveable component is requested to move in a way considered to be risky, and if a force discrepancy is detected, a system commands an action. In one specific embodiment the action is a corrective action.

BRIEF DESCRIPTION OF THE DRAWINGS

The foregoing and other features of the various embodiments of a bed having the above mentioned detection and response capability will become more apparent from the following detailed description and the accompanying drawings in which.

DETAILED DESCRIPTION

Figure 1:
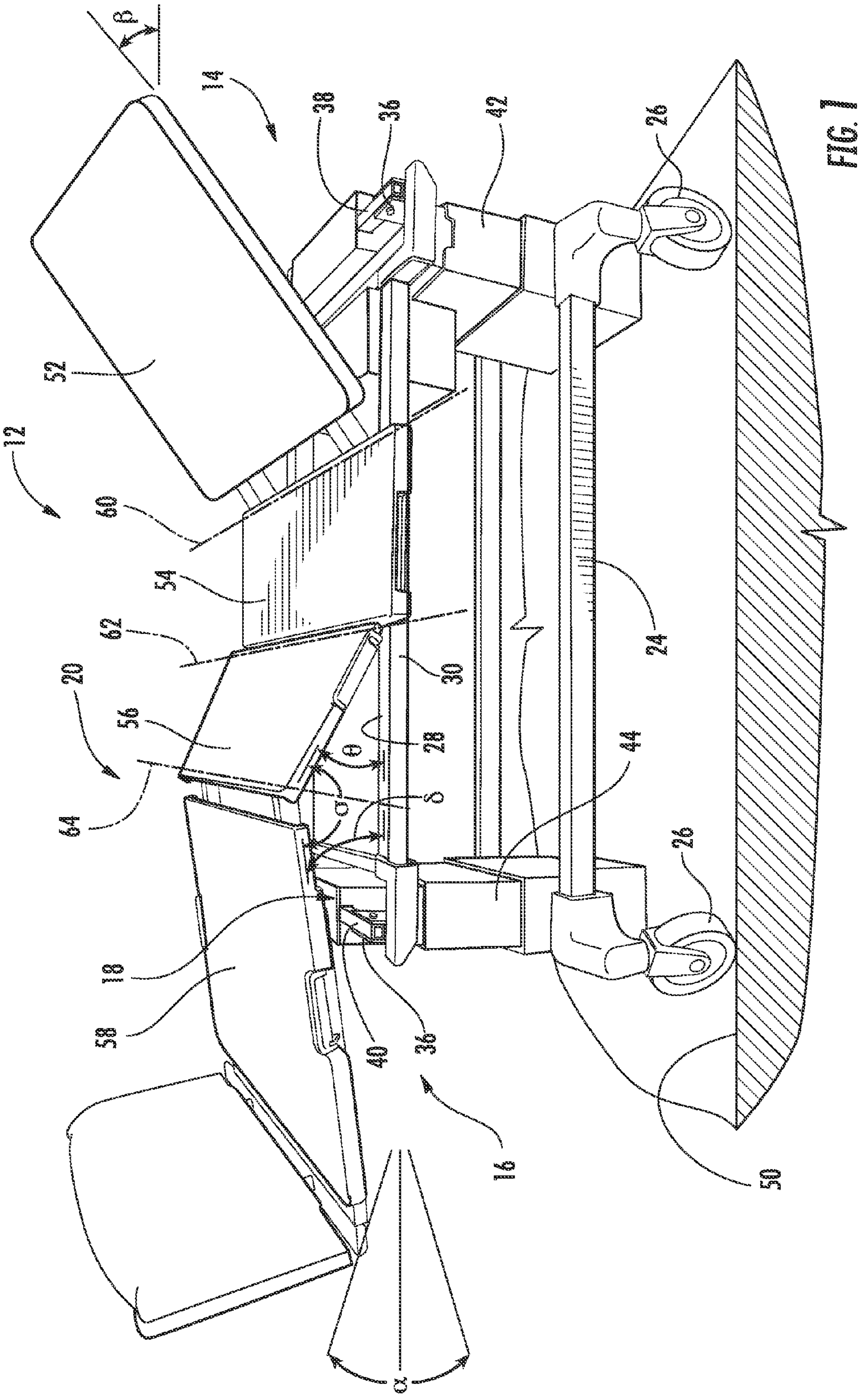
FIG. 1 is a simplified perspective view of a hospital bed having movable components.
Figure 1A:
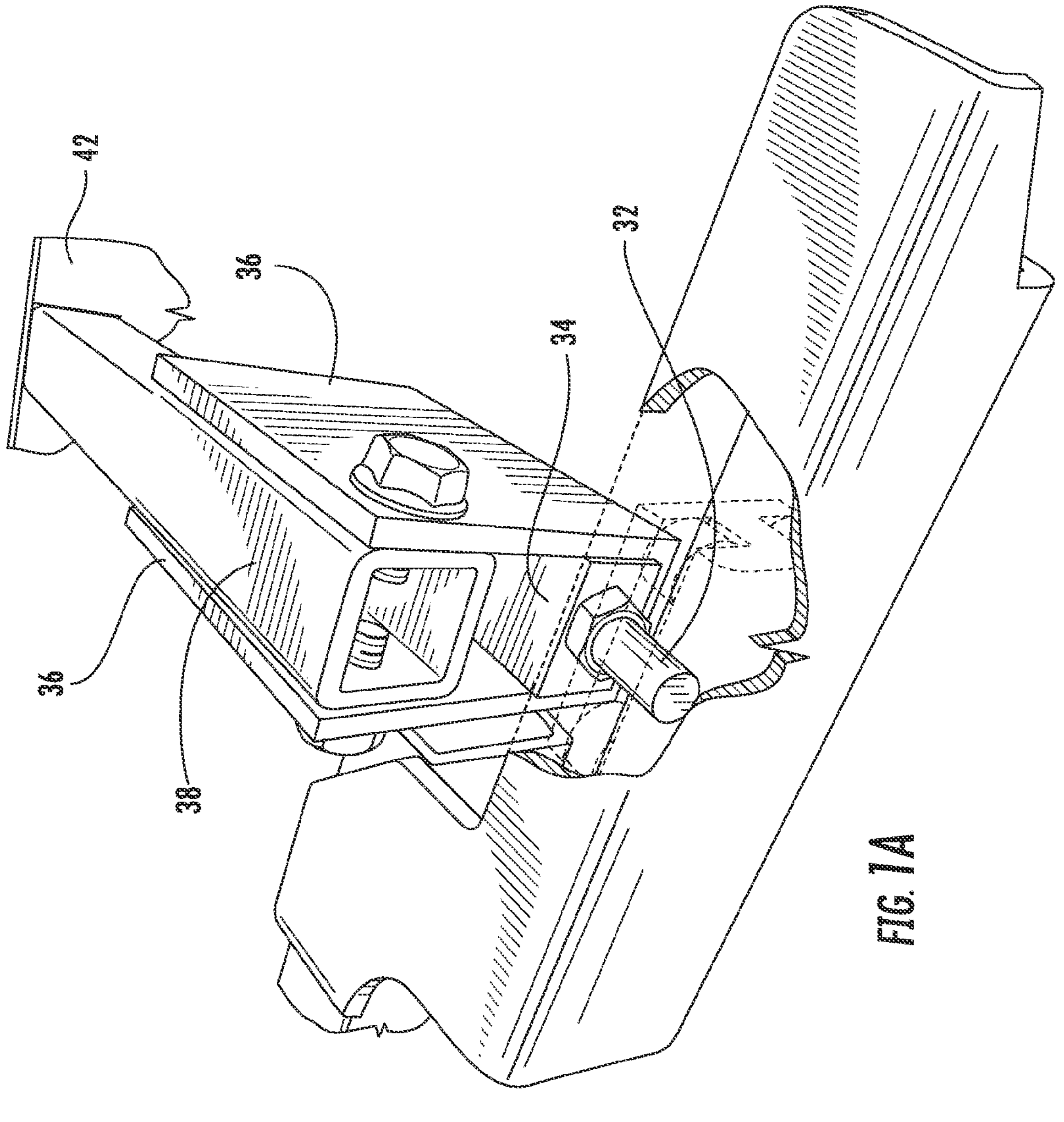
FIG. 1A is a perspective view of a portion of the bed of FIG. 1.
Figure 2:
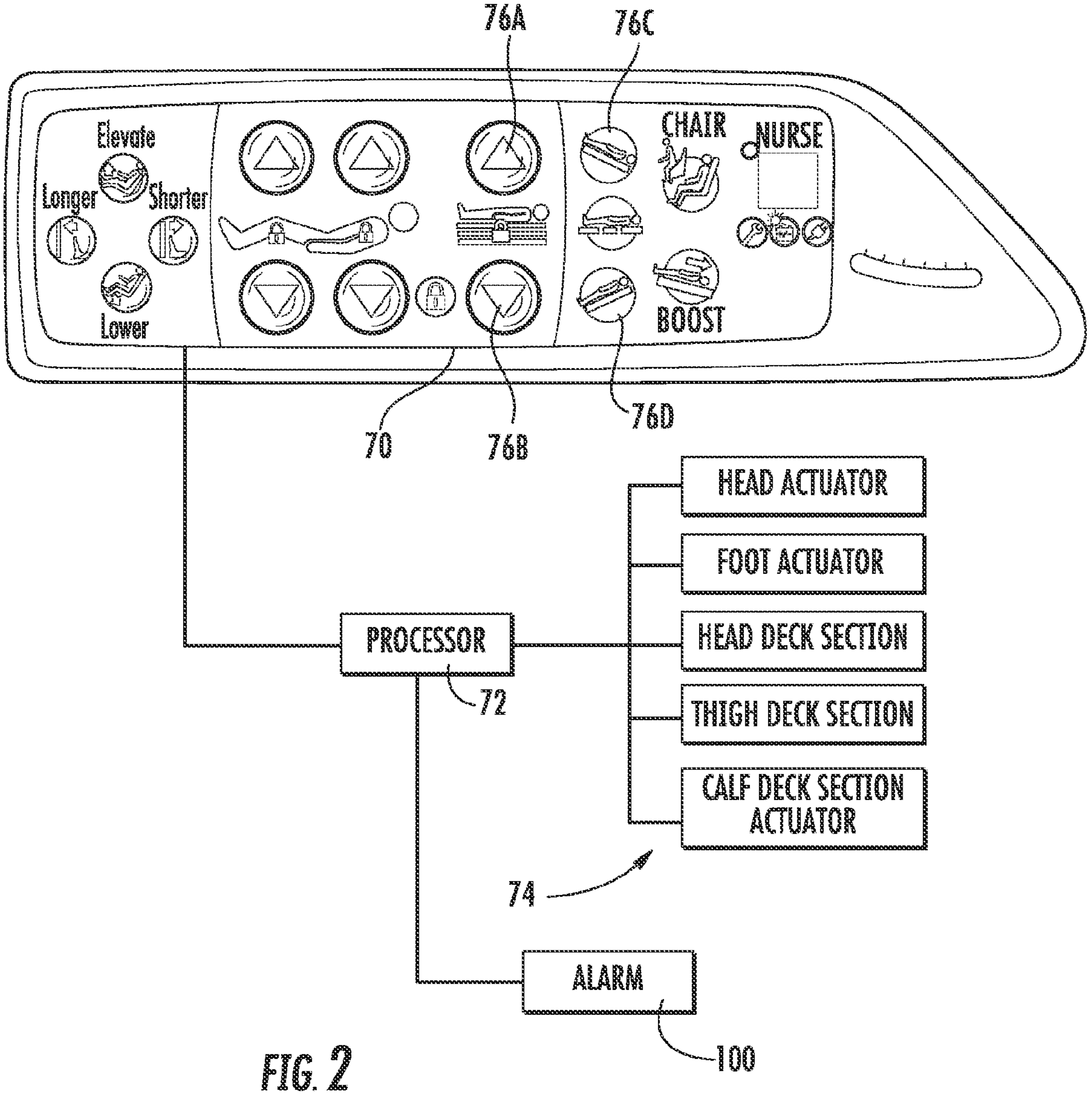
FIG. 2 is a side elevation view showing a user operable keypad and schematically showing certain components operable by way of the keypad.

Referring to FIGS. 1, 1A, and 2, a hospital bed 12 extending longitudinally from a head end 14 to a foot end 16, and laterally from a left side 18 to a right side 20. The bed includes a base frame 24, a caster 26 at each of the four corners of the base frame, and a weigh frame 28 having longitudinally extending left and right rails 30. A connector 32, projects laterally inwardly from the head and foot ends of each rail into a load cell 34 which uses changes in deformation induced electrical resistance to determine the magnitude of a force applied to the load cell. Each load cell is attached to a load cell housing 36. The two head end housings are secured to a head end cross beam 38; the two foot end housings are similarly secured to a foot end cross beam 40. A head actuator, shown schematically in FIG. 2, driven by an electrical motor (not shown) is housed within a head end telescoping canister assembly 42. A foot actuator driven by an electrical motor (also not shown) is housed within a foot end telescoping canister assembly 44. The canister assemblies, actuators, cross beams and load cell housings are components of a linkage that renders the weigh frame moveable with respect to the base frame and are also part of a load path that conveys the weight of the weigh frame, and anything supported by it, to a ground (e.g. floor 50 or base frame 24). For example, the load path for the weigh frame extends from the weigh frame, to the load cells, to the load cell housings, to the cross beams and through the canister assemblies and actuators to the base frame. The load on the base frame is conveyed to floor 50 by way of casters 26.

The head and foot actuators are operable in unison to raise or lower the weigh frame relative to a "stationary" reference or ground, such as floor 50 or base frame 24, without changing it's angular orientation $\alpha$. The actuators are also operable differentially to raise or lower one end of the weigh frame relative to the other, thereby changing angular orientation $\alpha$. Such differential operation causes at least part of the weigh frame to move down from an initial elevation to a lower elevation. The term "down", when used herein in the context of the weigh frame, means a motion or direction of motion of the weigh frame or its actuators that causes at least part of the weigh frame to move toward a lower elevation.

The bed also includes four deck sections, a head or upper body section 52, a seat section 54, a thigh section 56 and a calf section 58. The seat section is fixed to the weigh frame in a way that prohibits relative motion therebetween. The head, thigh, and calf deck section components are movable with respect to a ground, e.g. the weigh frame. Specifically the head and thigh deck sections are pivotably secured to the weigh frame so that the sections can pivot relative to the weigh frame about pivot axes 60, 62 in response to movement of respective actuators 74 shown schematically in FIG. 2. Calf section 58 is pivotably secured to thigh section 56 so that the calf and thigh sections are pivotable relative to each other about pivot axis 64. One or more of the pivot axes may also be longitudinally translatable. The head section actuator extends between the weigh frame and the head section. The thigh section actuator extends between the weigh frame and the thigh section. The calf section actuator extends between the weigh frame and a bracket attached to both the thigh section and the calf section in the vicinity of pivot axis 64. The actuators are operable to move the deck sections relative to a "stationary" ground, such as the floor, the base frame or the weigh frame. Operating the head section actuator changes the angular orientation $\beta$ of the head deck section relative to the weigh frame in the range of about 0° (parallel to weigh frame rails 30) to about 65°. Operation of the thigh and/or calf section actuators changes in the angular orientations $\theta$, $\delta$ of the thigh and calf sections relative to the weigh frame and the orientation $\sigma$ of the calf section relative to the thigh section. The approximate ranges for $\theta$, $\delta$ and $\sigma$ are 0° to 30°, 0° to 22° and 0° to 128° respectively. The term "down", when used herein in the context of the moveable deck section components 52, 54, 56, 58 means a motion or direction of motion of the deck section or deck section actuators that causes the deck section to assume an orientation more parallel to the weigh frame rails 30 or that causes at least part of a deck section to move to a lower elevation.

When the bed is in use a mattress, not shown, rests on the deck and an occupant rests on the mattress. The weight of the deck, the mattress and the occupant is conveyed to a ground by way of the load path described above. Typically the sum of the weights sensed by the four load cells $W_T$ is "zeroed out" before the occupant moves onto the mattress so that the load cell weight readings, when added together, register only the occupant's weight.

Figure 3:
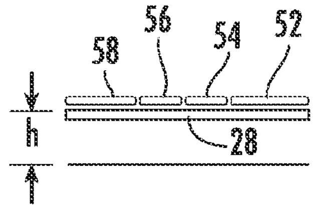
FIG. 3 is a chart showing certain possible configurations of the bed and also showing component and configuration specific values of a threshold for detecting a pinch event.
Figure 3:
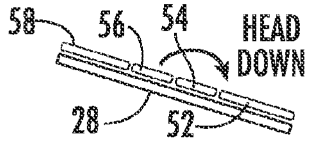
Figure 3:
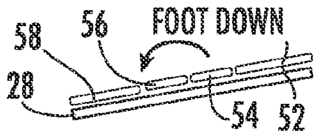
Figure 3:
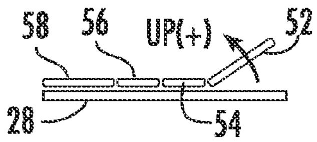
Figure 3:
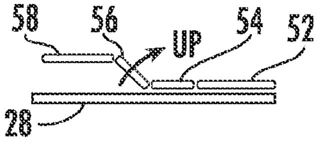
Figure 3:
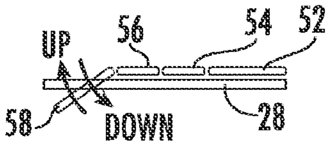
Figure 3:
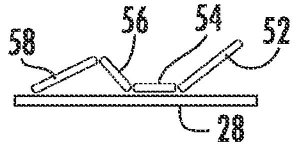

Referring to FIG. 2, a user specifies a desired bed configuration by way of a keypad 70. The keypad is mounted on one of four siderails, not illustrated, that border the deck to define the lateral extremities of the occupant support area. When the user presses keys on the keypad, processor 72 requests operation of one or more of the actuators 74 to change the configuration of the bed to the desired configuration. FIG. 3 is a chart with diagrammatic depictions of various states or configurations of the bed. The first row of the chart shows the weigh frame level and the deck flat (all deck sections at a 0° orientation relative to the weigh frame rails). The elevation h of the weigh frame can be adjusted by pressing one of keys 76A, 76B (FIG. 2) thereby operating the head and foot actuators in unison. Row two of the chart shows the bed in a head down orientation achieved by pressing key 76C to command a downward motion of the head actuator and an upward motion of the foot actuator. Row three shows the bed in a foot down orientation achieved by using key 76D to command a downward motion of the foot actuator and an upward motion of the head actuator. Rows four through seven show the weigh frame level with various deck sections at orientations of other than 0° relative to the weigh frame. Bed configurations other than those illustrated in FIG. 3, including configurations that are composites of those illustrated, may also be achievable.

When any of the five actuators moves one of the moveable components in a direction that entails a risk of an object becoming pinched between the moving component and a ground, the motion is considered to be a risk generating motion. Motions in a down direction as defined above are risk generating motions. However the definition is only an example and does not preclude "down" motions being exempted from the risk generating category, nor does it prohibit other motions from being declared risk generating motions. For example, a concern about a collision between an IV pole attached to the weigh frame and the ceiling could result in an "up" movement of the weigh frame being designated a risk generating motion.

During risk generating motion of a movable component an object can become pinched between the component and a ground such that the object reacts at least some of the load that would otherwise pass through the load cell, i.e. the object and the load cell offer parallel load paths to the ground. As a result, one or more of the load cells will be offloaded. The offloading manifests itself as a weight gradient $\Delta W_T/\Delta t$ (in the limit $dW_T/dt$) i.e. as a change, over some time interval, in the sum of the weights perceived by the load cells.

Figure 4:
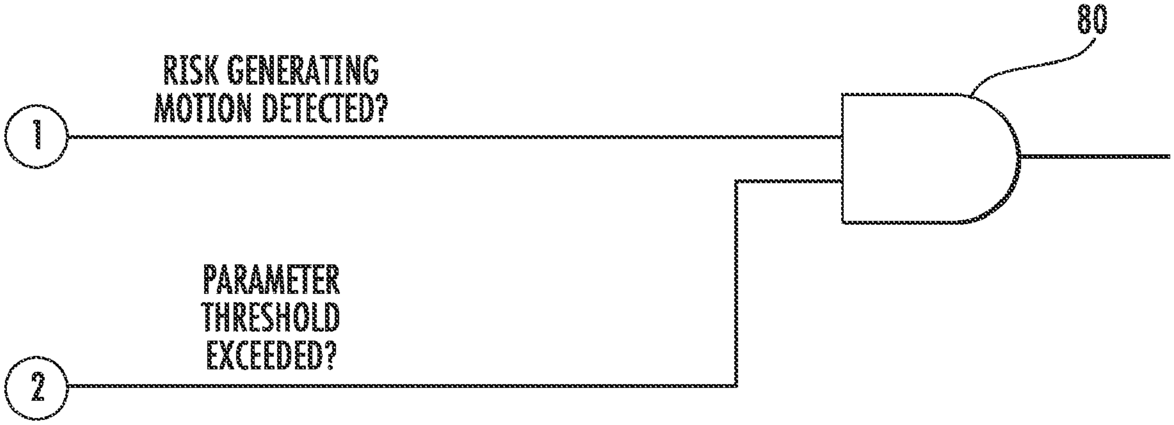
FIG. 4 is a logic flow diagram showing an action being commanded in response to a request for a risk generating motion of a movable bed component in combination with a perceived exceedence of a parameter threshold such as a weight discrepancy.

FIG. 4 shows a logic flow diagram for the basic elements of a system operable to command an action in the event that a perceived weight discrepancy as described above occurs in combination with a risk generating motion. If a risk generating motion is detected (input 1 to AND gate 80) and the weight gradient exceeds a threshold value (input 2 to AND gate 80) the system commands an appropriate action. Techniques for determining the presence of a risk generating motion and a weight discrepancy are described below.

Figure 5:
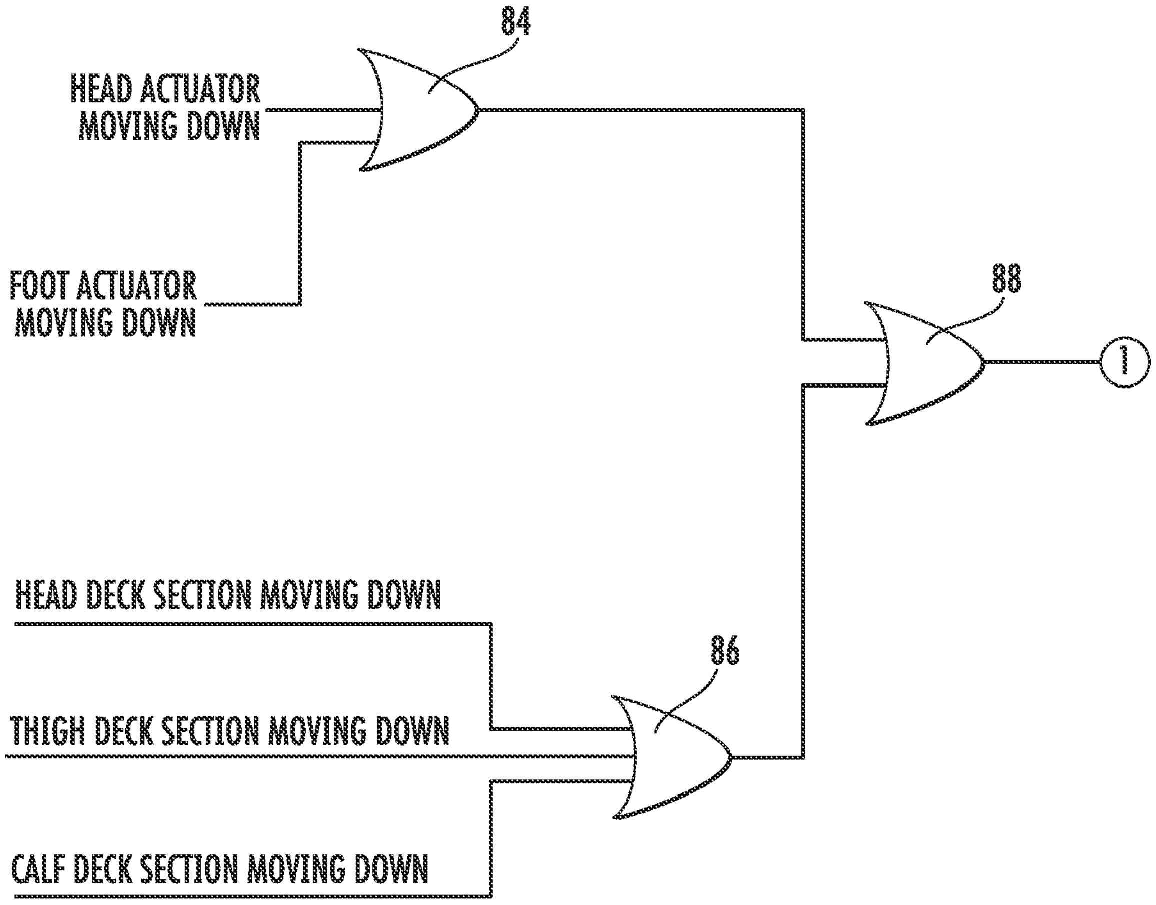
FIG. 5 is a logic flow diagram showing a procedure for determining the presence or absence of the risk generating motion of FIG. 4.

Referring to FIG. 5 the existence of a risk generating motion is determined by monitoring whether or not an actuator is moving in a direction that may cause a pinch event. In the illustrated example, only a "down" motion is envisioned as being a risk generating motion. If any one of the actuators or its associated deck section or linkages is moving in the down direction as indicated by OR gates 84, 86, 88, a risk generating motion is declared to be underway thereby satisfying the first input for the AND gate 80 of FIG. 4. When determining whether or not a risk generating motion is underway, an actuator is considered to be moving if it is either actually moving or has been requested to move. Including requested motion in the definition accounts for the possibility that a pinch event involving a rigid object will result in an unloading of the load cells, even though the object's rigidity prevents any noteworthy actual movement of the actuator. However the actuator will nevertheless still be subject to a request to move.

Figure 6:
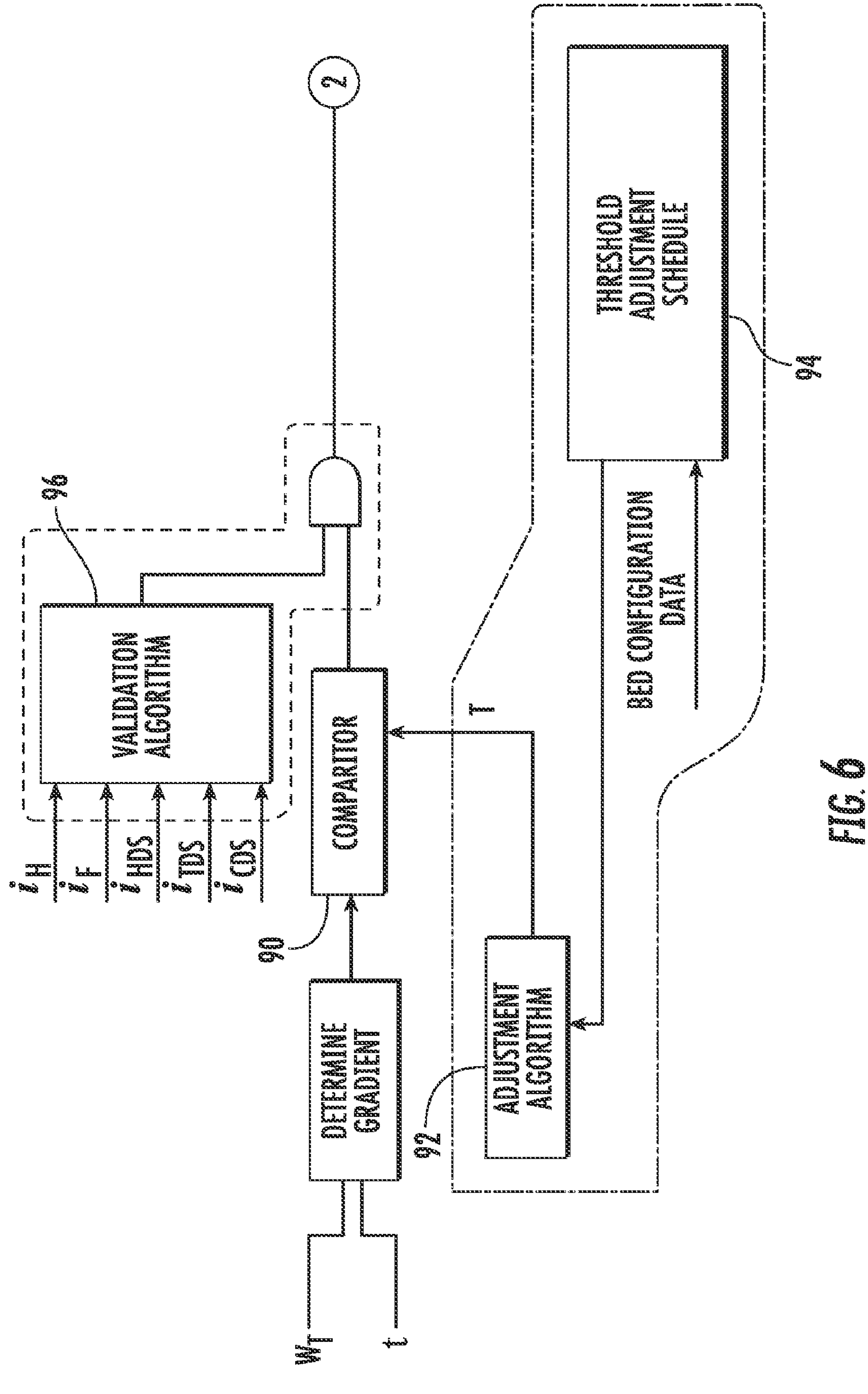
FIG. 6 is a logic flow diagram showing a procedure for determining the existence of a weight discrepancy and also showing two possible enhancements to the procedure.

Referring to FIG. 6 the existence of a weight discrepancy is determined by monitoring total weight $W_T$ as a function of time t, determining the weight gradient $\Delta W/\Delta t$ or $dW/dt$, and using comparator 90 to compare the gradient to a weight gradient threshold T. Those skilled in the art will recognize that terms such as "weight", "weight gradient" and the weight-based "threshold" are typically not meant literally but instead are parameters indicative of weight such as electrical readings or mechanical deflections. In some beds a processor samples the load cell outputs and calculates the total weight at regular, predefined time intervals (e.g. every 500 milliseconds). In such cases the time sampling is implicit in the weight readings and therefore time need not be sampled explicitly. Comparator 90 compares the weight gradient to a threshold T. If the weight gradient exceeds the threshold (e.g. is arithmetically more negative than the threshold) a weight discrepancy is considered to have occurred, thereby satisfying the second input to AND gate 80 of FIG. 4. By way of example, a pinch event involving a rigid object will cause a relatively large unloading over a relatively short time interval whereas a pinch event involving a soft or flexible object will cause a more modest unloading and/or will occur over a relatively longer interval. Accordingly, the threshold value is left to the discretion of the designer who can make design trade-offs between system sensitivity and susceptibility to "false alarms".

The dash/dot line border of FIG. 6 embraces an optional enhancement in which the threshold T is a function of the initial state or configuration of the bed and/or is component specific. A threshold adjustment algorithm 92 receives threshold information from lookup table 94, which schedules threshold values as a function of bed configuration. The lookup table specifies threshold values as a function of information such as the angular orientations of the weigh frame and deck sections just prior to the onset of actuator motion. FIG. 3 shows sample thresholds. For example, the weight gradient threshold associated with a change in elevation of the weigh frame may be $T_1$. The threshold associated with a change in weigh frame orientation in the head down direction may be $T_2$ for initial orientations in the range of 0° to 10° and $T_3$ for initial orientations greater than 10° and up to 20°. The threshold associated with a change in weigh frame orientation in the foot down direction may be $T_4$ for initial orientations in the range of 0° to −10° and $T_5$ for initial orientations greater than −10° up to −20°. Thresholds associated with other changes in the bed configuration, including thresholds for composite changes (e.g. a change in elevation h concurrent with a change in the orientation of the head deck section) may also be included. A threshold may be an absolute value (e.g. 10 kg) or may be a fraction of the occupant's weight (e.g. $0.08W_T$). Either way, the threshold (absolute value or weight fraction) may be preprogrammed or may be a user input. Alternatively, threshold adjustments may be based on non-initial rather than initial state or configuration of the bed.

The dashed border of FIG. 6 embraces another optional enhancement in which a perceived exceedence of the weight threshold is validated by an auxiliary criterion so that both the weight gradient threshold exceedence criterion and the auxiliary criterion must be satisfied in order to declare the existence of a weight discrepancy. In the illustrated example it is assumed that the actuators are driven by electric motors. A validation algorithm 96 monitors current drawn by the motors (e.g. $i_H$, $i_F$, $i_{HDS}$, $i_{TDS}$, $i_{CDS}$ for the head, foot, head deck section, thigh deck section and calf deck sections respectively). If a current exceeds a maximum anticipated value, the validation criterion is satisfied. The output of comparator 90, which indicates exceedence of the weight threshold, is AND'd together with the output of the validation algorithm so that the weight discrepancy input to AND gate 80 of FIG. 4 is TRUE only if the weight gradient and the motor current draw are both excessive. In order to account for transients and/or spurious signals it may be desirable for the validation algorithm to produce a TRUE output only if the current draw is excessive for more than a specified interval of time.

The tailored thresholds and the validation criterion of FIG. 6 can be used separately or together.

If both a risk generating motion and a weight discrepancy are detected the system commands an action. Preferably the action is a corrective action. One possible corrective action is for processor 72 to issue a request for the weigh frame to move in a manner that will "unpinch" the object thereby relieving the weight discrepancy. Such remedial movement of the weigh frame may be sufficient to address not only pinch events caused by the weigh frame itself but also pinch events caused by one of the deck sections. A more specific corrective action is the issuance of a request for at least the weigh frame to move to a higher elevation. Once again, such movement may be sufficient to remedy pinch events caused by either the weigh frame or a deck section. Another possible corrective action is the issuance of a request for one of the movable components (weigh frame or a deck section) to move in a manner that will "unpinch" the object. Presumably the request would be issued to the actuator for the movable component responsible for the pinch event, however it is not out of the question that movement of another component may be effective. A more specific corrective action is the issuance of a request to reverse the motion of one of the movable components.

Alternatively, the response to the existence of a risk generating motion and the presence of a weight discrepancy could be a non-corrective action. One possible non-corrective action is to issue a "cease motion" request to the actuator for at least one movable component, presumably the component associated with the risk generating motion. Another non-corrective action is issuance of a request to operate an alarm 100 (FIG. 2). The alarm may take many forms including a visible alarm or an audible alarm. The alarm itself could be local to the bed or at a more remote location. The alarm could take the form of a nurse call signal.

Figure 7:
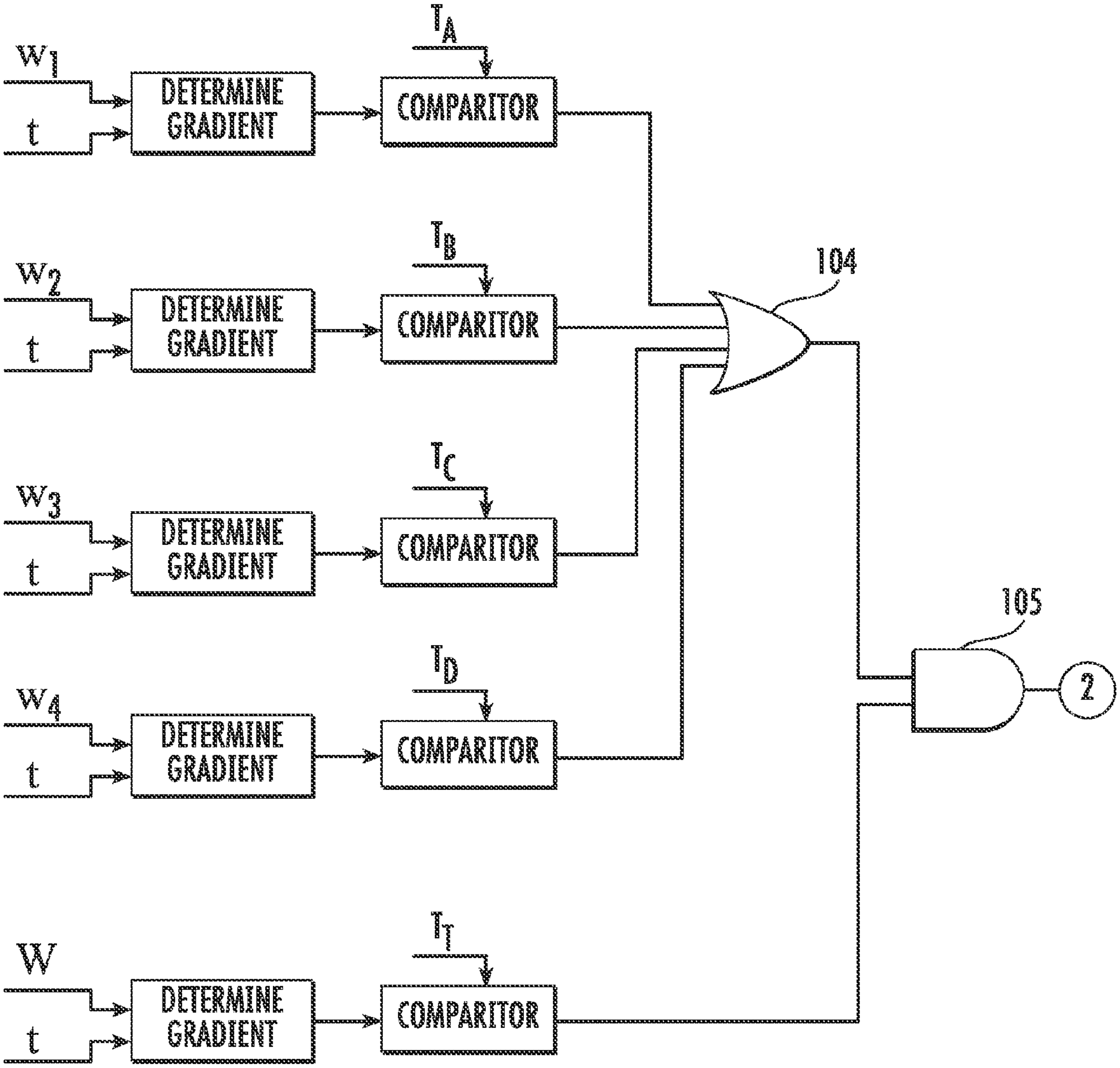
FIG. 7 is a logic flow diagram showing a procedure for determining the existence of a weight discrepancy using individual force sensor readings in combination with a total force reading.
Figure 8:
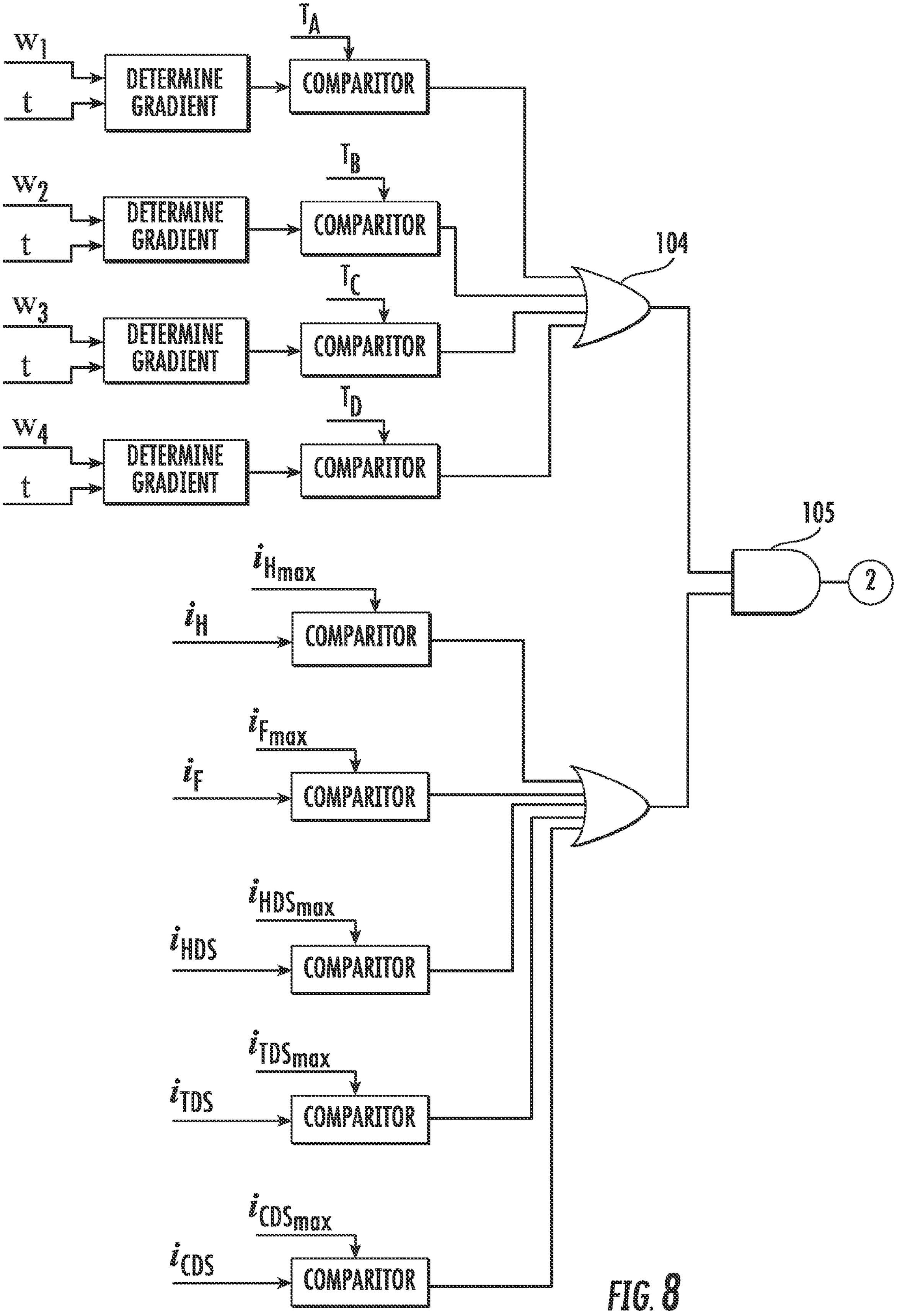
FIG. 8 is a logic flow diagram similar to that of FIG. 7 showing a procedure for determining the existence of a weight discrepancy using individual force sensor readings in combination with exceedence of actuator current draw limits.
Figure 9:
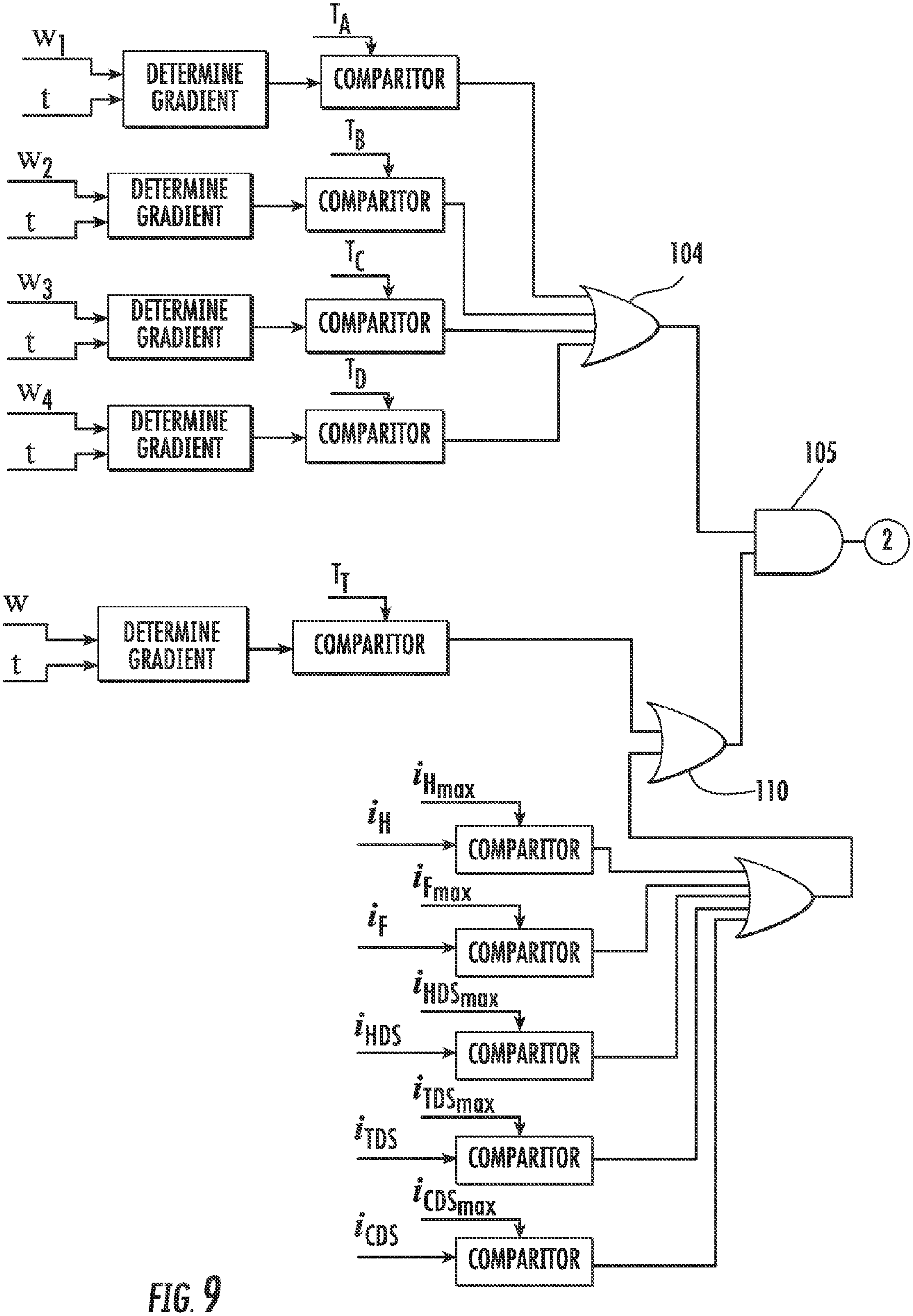
FIG. 9 is a logic flow diagram similar to that of FIGS. 7 and 8 showing a procedure for determining the existence of a weight discrepancy using individual force sensor readings in combination with a total force reading and exceedence of actuator current draw limits.

Although the foregoing description describes the use of a discrepancy in the total weight $W_T$, to reveal the existence of an undesirable interaction with an object, the weight readings of the individual load cells $W_1$, $W_2$, $W_3$, $W_4$ may also be used. Referring to FIG. 7 the weight gradient of each of the four individual load cells is determined and is compared to a gradient threshold ($T_A$, $T_B$, $T_C$, $T_D$), which need not be the same for each load cell. OR gate 104 outputs a TRUE value if any one of the load cell weight gradients exceeds its respective threshold. The output of OR gate 104 is AND'd together with the output of a total weight comparison at AND gate 105. The use of the total weight comparison and AND gate 105 accounts for the possibility that excessive gradients registered by individual load cells may be the result of something other than a pinch event, for example an occupant merely redistributing his or her weight on the bed. FIG. 8 shows a system in which actuator current draw rather than total weight is used in combination with the individual load cell readings to account for non-pinch events. FIG. 9 shows a system in which both the total weight criterion and the current draw criterion are used to distinguish between pinch events and non-pinch events. FIG. 9 shows the result of the total weight criterion and the current draw criterion being OR'd together at OR gate 110, however they may be AND'd together at the discretion of the system designer. Although the systems of FIGS. 7-9 rely on total weight, current draw or a logical combination of current weight and current draw to distinguish weight offloading from weight redistribution or other non-offloading occurrences, it may be possible to rely exclusively on the individual load cell readings, for example by setting a weight gradient threshold sufficiently large to ensure that a perceived weight gradient can only be the result of a pinch event.

Although this disclosure refers to specific embodiments, it will be understood by those skilled in the art that various changes in form and detail may be made without departing from the subject matter set forth in the accompanying claims.

I claim:

1. An article comprising:

a component moveable with respect to a ground and supported by a load path extending from the component to the ground;

a force detector in the load path for detecting at least a part of the weight of the moveable component; and a system operable to command an action in response to a request for a risk generating motion of the moveable component in combination with a perceived weight change in excess of a threshold value which is a function of an initial configuration of the bed.

2. The article of claim 1 wherein the commanded action is a corrective action.

3. The article of claim 2 wherein the corrective action is issuance of a request for a weigh frame to move in a manner to relieve the weight discrepancy.

4. The article of claim 2 wherein the corrective action is issuance of a request to elevate a weigh frame.

5. The article of claim 2 wherein the corrective action is issuance of a request for at least one moveable component to move in a manner to relieve the weight discrepancy.

6. The article of claim 2 wherein the corrective action is issuance of a request to reverse motion of at least one movable component.

7. The article of claim 1 wherein the commanded action is a non-corrective action.

8. The article of claim 7 wherein the non-corrective action is issuance of a request to cease motion of at least one movable component.

9. The article of claim 7 wherein the non-corrective action is issuance of a request to operate an alarm.

10. The article of claim 1 wherein:

the article is a bed;

the moveable component is at least one of a weigh frame and a deck section secured to the weigh frame;

the force detector is a load cell; and the system operable to command an action does so in response to detection of requested risk generating motion of the weigh frame and/or the deck section in combination with the weight change.

11. The article of claim 10 wherein the bed includes at least one of a head actuator, a foot actuator, a head deck section actuator, a thigh deck section actuator and a calf deck section actuator, and a risk generating motion is detected if at least one of the actuators is commanded to move its associated movable component in a down direction, the down direction for the head and foot actuators being a direction for moving at least part of the weigh frame toward a lower elevation, and the down direction for the deck section actuators being a direction for causing the associated deck section to assume an orientation more parallel to the weigh frame or that causes at least part of a deck section to move to a lower elevation.

12. The article of claim 1 comprising one or more force detectors and a weight discrepancy is perceived when the sum of the weights detected by the force detectors decreases by more than a threshold amount over a time interval $\Delta t$.

13. The article of claim 12 wherein the threshold amount is a fraction of an occupant's weight.

14. The article of claim 13 wherein the fraction is user specifiable.

15. The article of claim 12 wherein the threshold exceedence is validated by at least one auxiliary criterion.

16. The article claim 15 wherein the auxiliary criterion is excessive current draw of a motor that drives an actuator.

17. The article of claim 1 comprising one or more force detectors and wherein a weight discrepancy is perceived when weight detected by at least one of the force detectors changes by more than a threshold amount over a time interval $\Delta t$ and a validation criterion is satisfied.

18. The article of claim 17 wherein the validation criterion is satisfied if the sum of the weights detected by the force detectors decreases by more than a specified amount over the time interval.

19. The article of claim 17 wherein the validation criterion is satisfied if current draw of a motor exceeds a specified amount.

20. The article of claim 19 wherein the validation criterion is satisfied if the current draw exceedence exceeds the specified amount for at least a specified interval of time.

21. The article of claim 17 wherein the validation criterion is satisfied if at least one force detector experiences a rate of offloading that exceeds a collision rate.

* * * * *